United States Patent
Pollanen

(10) Patent No.: US 10,132,495 B2
(45) Date of Patent: Nov. 20, 2018

(54) METHOD AND SYSTEM FOR MONITORING THE MASS CHANGES OF HEAT EXCHANGERS OF A STEAM BOILER

(71) Applicant: ANDRITZ OY, Helsinki (FI)

(72) Inventor: Ilkka Pollanen, Valkeala (FI)

(73) Assignee: ANDRITZ OY, Helsinki (FI)

( * ) Notice: Subject to any disclaimer, the term of this patent is extended or adjusted under 35 U.S.C. 154(b) by 0 days.

(21) Appl. No.: 14/898,050

(22) PCT Filed: Jun. 10, 2014

(86) PCT No.: PCT/FI2014/050469
§ 371 (c)(1),
(2) Date: Dec. 11, 2015

(87) PCT Pub. No.: WO2014/199016
PCT Pub. Date: Dec. 18, 2014

(65) Prior Publication Data
US 2016/0116159 A1     Apr. 28, 2016

(30) Foreign Application Priority Data
Jun. 11, 2013   (FI) .................................. 20135639

(51) Int. Cl.
*B60H 1/00*    (2006.01)
*F22B 37/56*   (2006.01)
(Continued)

(52) U.S. Cl.
CPC ............. *F22B 37/56* (2013.01); *G01G 19/14* (2013.01); *G01G 19/18* (2013.01); *G01G 19/52* (2013.01)

(58) Field of Classification Search
CPC ........... F22B 37/56; F22B 37/48; F22B 33/00
See application file for complete search history.

(56) References Cited

U.S. PATENT DOCUMENTS 3,236,295 A * 2/1966 Yurko ..................... F28F 9/007
                                                        165/67
4,174,549 A * 11/1979 Michelson ............... F23J 3/023
                                                        15/312.1
(Continued)

FOREIGN PATENT DOCUMENTS

DE       196 05 287       8/1997
DE       199 09 267       9/2000
(Continued)

OTHER PUBLICATIONS

Arcomag; Introduction to Strain & Strain Measurement; http://www.weighing-systems.com/TechnologyCentre/Strain1.pdf accessed May 10, 2016; wayback when machine earliest saved (2004) http://web.archive.org/web/20041114051318/http://weighing-systems.com/TechnologyCentre/Strain1.pdf.*

(Continued)

*Primary Examiner* — Len Tran
*Assistant Examiner* — Gordon Jones
(74) *Attorney, Agent, or Firm* — Nixon & Vanderhye PC

(57) ABSTRACT

A method and a system for monitoring the mass changes of a heat exchanger bank of a steam boiler. The heat exchanger bank is supported by hanger rods and support beams to the frame beams of the steam boiler. In the method, the web plates of the support beams are provided with strain gages for measuring the changes in the strain state generated in the support beams by the mass of the heat exchanger bank. The system includes strain gages fixed to the web plates of the support beams for measuring the changes in the strain state generated in the support beam by the mass of the heat exchanger bank, data logging means for logging the measurement data and a computer or a corresponding calculation unit for processing the measurement data.

16 Claims, 3 Drawing Sheets

(51) Int. Cl.
*G01G 19/14* (2006.01)
*G01G 19/18* (2006.01)
*G01G 19/52* (2006.01)

(56) References Cited

U.S. PATENT DOCUMENTS

| | | | |
|---|---|---|---|
| 4,428,329 A | 1/1984 | Rees | |
| 4,474,497 A * | 10/1984 | Sullivan | F27D 99/00 122/379 |
| 5,007,501 A * | 4/1991 | Baston | E04G 1/152 182/128 |
| 6,323,442 B1 | 11/2001 | Jones | |
| 7,017,500 B2 * | 3/2006 | Jones | F23H 17/00 110/101 CC |
| 7,324,007 B2 * | 1/2008 | Sunderman | E21F 17/185 340/539.1 |
| 8,943,902 B2 * | 2/2015 | Bosscher | G01L 5/226 73/862.041 |
| 2004/0006841 A1 | 1/2004 | Jameel et al. | |
| 2004/0226758 A1 | 11/2004 | Jones et al. | |
| 2008/0210178 A1 | 9/2008 | Frach et al. | |
| 2011/0158806 A1 * | 6/2011 | Arms | F03D 1/0658 416/31 |

FOREIGN PATENT DOCUMENTS

| | | | |
|---|---|---|---|
| EP | 0 073 851 | 3/1983 | |
| FR | 2555740 | 5/1985 | |
| JP | 1-265918 | 10/1989 | |
| WO | WO 9423275 A1 * | 10/1994 | ............ G01G 19/12 |
| WO | 2004102104 | 11/2004 | |

OTHER PUBLICATIONS

Transducer Techniques (Wheatstone Bridge); https://www.transducertechniques.com/wheatstone-bridge.aspx accessed May 10, 2016; wayback when machine earliest saved (Sep. 9, 2012) http://web.archive.org/web/20120909212044/http://www.transducertechniques.com/wheatstone-bridge.aspx.*
Junqing Ma and Aiguo Song; Fast Estimation of Strains for Cross-Beams Six-Axis Force/Torque Sensors by Mechanical Modeling; Published: May 17, 2013; http://www.ncbi.nlm.nih.gov/pmc/articles/PMC3690075/pdf/sensors-13-06669.pdf accessed May 10, 2016; Sensors 2013, 13, 6669-6686; doi:10.3390/s130506669.*
J M Mosquera, P. S. Symonds and H. Kolsky; On Elastic-Plastic and Rigid-Plastic Dynamic Response With Strain Rate Sensitivity; Int. J. Mtth. Sci. vol. 27, No. 11/12, pp. 741-749, 1985.*
R.J. Mainstone; Properties of materials at high rates of straining or loading.*
International Search Report cited in PCT/FI2014/050469, dated Feb. 20, 2015, four pages.
"A Bit of Experience", (2004), 4 pages.

* cited by examiner

METHOD AND SYSTEM FOR MONITORING THE MASS CHANGES OF HEAT EXCHANGERS OF A STEAM BOILER

RELATED APPLICATIONS

This application is a U.S. National Phase Application of PCT/FI2014/050469, filed internationally on Jun. 10, 2014, and claims priority to Finnish patent application 20135639 filed Jun. 11, 2013, the entirety of both of these applications is incorporated by reference.

FIELD OF THE INVENTION

The invention relates to a method for monitoring the mass changes of a heat exchanger bank of a steam boiler, the heat exchanger bank being supported by hanger rods and support beams to the frame beams of the steam boiler. The invention also relates to a system for monitoring the mass changes of such heat exchanger banks.

BACKGROUND OF THE INVENTION

The upper part of a steam boiler is provided with a set of heat exchangers, in which the heat contained in flue gases is transferred to the water or water vapor flowing in a piping. A steam boiler can have e.g. eight heat exchanger banks connected in series, each of which can have e.g. 25 planar heat exchangers, between which the flue gas to be cooled flows. In the coolest heat exchanger banks, the heat transfer medium is water (feed water preheaters, i.e. economizers), in the next heat exchanger bank the water is vaporized (evaporator, i.e. steam generating bank) and in the heat exchanger banks with the highest temperature, which are closest to the furnace, the heat transfer medium is the steam which is to be superheated (superheaters).

For allowing an obstacle-free thermal expansion, the heat exchangers are usually suspended by means of hanger rods from support beams, which in turn are supported by the frame beams of the steam boiler. Fin plates may be arranged between the pipes of a heat exchanger piping bent in the form of a plane, whereby heat transfer plates are formed. Each heat exchanger bank is usually supported by two support beams provided with a number of vertical hanger rods, each of which is connected to either end of an individual heat transfer plate. The hanger rods can also support a midbeam in the direction of the support beams, or feed and discharge pipes, which support the heat transfer plates.

Fouling of the heat transfer surfaces of a steam boiler hampers the heat transfer from flue gas into the medium circulating in a heat exchanger. Recovery boilers used for the combustion of black liquor are especially prone to the fouling of heat transfer surfaces, since remarkable amounts of flue ash exit the furnace of the recovery boiler entrained in the flue gas flow, which flue ash forms onto the heat transfer surfaces deposits that are hard to remove.

Typically, impurities are removed from the heat transfer surfaces by means of a soot-blowing device, the operative steam for which is taken from the steam production of the boiler itself. Water washing can be used during shutdowns only, since, during operation, the water washing would cause thermal shocks which would stress the metal of the heat exchangers. The energy-content of the steam used for soot-blowing decreases the energy-content of the steam being transferred from the steam boiler into the turbine and other processes. Determining the soot-blowing intervals is essential for optimizing the overall efficiency of the steam boiler. The soot-blowing devices are located under various conditions and they are used based on an operation model drafted based on operational situations and experience. In the most important and most easily fouled areas, the soot-blowing devices are operated more frequently than elsewhere.

Soot-blowing maintains the efficiency and steam production capacity of the boiler by regularly removing deposited ash and slag from the heat surfaces of the boiler. Therefore, it is important to form by means of process measurements a view of the soot-blowing requirement of the boiler, so that soot-blowing can be effected in a proper part of the boiler at a proper time. By effecting the soot-blowing according to need, considerable amounts of steam can be saved and the efficiency obtained from the boiler is increased.

Monitoring the mass changes of heat exchangers for determining the optimal soot-blowing interval is known per se from publication U.S. Pat. No. 6,323,442 A, in which the mass of a heat exchanger bank suspended from hanger rods is measured by means of strain gages coupled to the hanger rods. The mass changes indicated by individual strain gages are added up, whereby the mass change of the whole heat exchanger bank is obtained. The hanger rods support the collector pipes of the inlet and outlet flows of the heat exchanger bank, which pipes in turn support the individual heat exchangers. The structure based on hanger rods is used e.g. because it is difficult to arrange an adequately firm support closer to the heat exchangers. In the example of the publication, the number of hanger rods and their strain gages is 20 for each heat exchanger bank. Additionally, the temperature of the hanger rods has to be measured for providing temperature compensation. Thus, a total of 40 measurement channels are required for each heat exchanger bank. In a subsequent publication of the same applicant, WO 2004102104 A, the corresponding measurements are made by means of load sensors from the hanger rods. Locating the load sensors elsewhere in an existing steam boiler is in practice difficult.

The large number of measurement channels is a remarkable problem for the installation of the measurement system and the equipment itself when the mass changes of several heat exchanger banks are to be measured. Thus, the large number of measurement points has a significant effect on the equipment and installation costs of the measurement system. The conditions under which strain gages are installed in hanger rods are highly disadvantageous, which increases the cost especially when the measurement arrangement is installed in an existing steam boiler as a retrofit. In order to obtain reliable results, the loads of the hanger rods have to be equalized and the measurement system has to be calibrated regularly, which is difficult in this embodiment.

A solution is known from document FR 2555740 A1 where the deformation of a frame beam bearing the load of the whole coal-fired boiler is measured in order to monitor the amount of slag in the boiler. The sensors used are vibrating wires fixed to the upper and lower flange of the frame beam and changing the vibrational frequency according to changes of the bending of the frame beam. The sensors are fixed centrally along the unsupported length of the frame beam. The sensors fixed to the upper flange of the frame beam measure the compressive strain and the sensors fixed to the lower flange of the frame beam measure the tensile strain. The sensors allow one to obtain an idea of the weight of the whole boiler, but they do not give any understanding of the weight of the different parts of the boiler.

The object of the invention is to eliminate the problems relating to the prior art solutions.

DESCRIPTION OF THE INVENTION

The method according to the invention is characterized in what is defined in the characterizing part of claim 1. Correspondingly, the system according to the invention is characterized in what is defined in the characterizing part of claim 10.

The first aspect of the invention is a method for monitoring the mass changes of a heat exchanger bank of a steam boiler, the heat exchanger bank being supported by hanger rods and support beams to the frame beams of the steam boiler. According to the invention, vertical support elements of the support beams are provided with strain gages by means of which the changes in the strain state generated in the support beams by the mass of the heat exchanger bank are measured.

The second aspect of the invention is a system for monitoring the mass changes of heat exchanger banks of a steam boiler, the heat exchanger banks being supported by hanger rods and support beams to the frame beams of the steam boiler. According to the invention, the system comprises a number of strain gages fixed to the web plates of the support beams for measuring the strain state generated in the support beam by the mass of the heat exchanger bank, data logging means for logging the measurement data and a computer or a suchlike calculation unit for processing the measurement data.

In one embodiment of the invention, strain gages are located on a support beam near to support points at which the support beam rests on a frame beam.

In one embodiment of the invention, the changes of the strain state at each support point are measured by four strain gages forming a Wheatstone full bridge connection.

In one embodiment of the invention, out of four strain gages, two are located in the direction of the principal strain and two are located perpendicularly to said direction of the principal strain.

In one embodiment of the invention, the principal strains of a support beam near to support points, preferably including the directions thereof, are determined by the finite-element method.

In one embodiment of the invention, at support points, strain gages are fixed to two vertical support elements of a support beam in order to compensate for any possible bending of the support beam.

In one embodiment of the invention, strain gages are located at a point of a web plate of a support beam to which the principal strain exerted by the support force of a frame beam is applied approximately at an angle of 45°.

In one embodiment of the invention, the measurement system is calibrated if so required by placing in a known position of the support beam, preferably at one or more hanger rods, a known mass.

In one embodiment of the invention, the measurement system is calibrated if so required by the finite-element method.

The invention is based on the insight that by measuring at a few points the changes in the strain state, of a beam supporting a heat exchanger bank it is possible to computationally define the mass changes of the heat exchanger bank in question. The measurement method allows one to obtain adequate information on the mass changes even in 2- or 3-dimensional extents with a reasonable and feasible number of measurement points and measurement channels.

Another advantage of the measurement performed from support beams compared to the prior art solutions is the fact that by a measurement made from two beams, 2-dimensional information on the concentration of the ash layers in different zones of a heat exchanger bank and also information on the zones from where mass is removed by means of soot-blowing can be obtained. Often, fouling of the heat delivery surfaces is one-sided or takes place regionally.

Corresponding support reactions could be measured from frame beams as well, but since they are much more robust than support beams, the resolution of the measurements would be poorer.

Soot-blowing devices often operate by blowing one side of the heat exchanger plate at a time. Additionally, soot-blowing can take place in the vertical direction in different zones of the heat exchanger. By soot-blowing a zone at a time and monitoring the corresponding mass change, a 3-dimensional understanding can be reached on the zones where ash is accumulated and where the soot-blowing should be focused.

The measurement of the strain states of a support beam is preferably performed by using a Wheatstone full bridge, which is capable of automatically compensating for the effect of temperature. Thus, no separate measurement channels are needed for measuring the temperature, and the number of measurement channels in decreased. In the prior art solution, the temperatures of hanger rods can vary significantly during operation and these changes can affect the measurement results despite the temperature compensation. The temperatures of the support beams further away from the furnace are usually lower and more uniform than the temperatures of the hanger rods that are in contact with the heat exchangers.

The measurement points are most preferably located on the beam that supports a heat exchanger bank at a point whereto the principal strain exerted by the support force of a frame beam is applied approximately at an angle of 45°. The optimal positioning and direction of strain gages can be determined by the finite-element method. Locating the measurement points in the area subject to the principal strains exerted by the support reaction on the web plate of a support beam will also best eliminate the changes caused by the deformations of the frame beams in the strains of the support beam.

In addition to the control of the soot-blowing devices, the mass change can be used for determining when a temporary cooling cycle for releasing deposits or alternatively the shutdown of the steam boiler for washing the heat transfer surfaces is to be performed.

LIST OF DRAWINGS

DETAILED DESCRIPTION OF THE INVENTION

Figure 1:
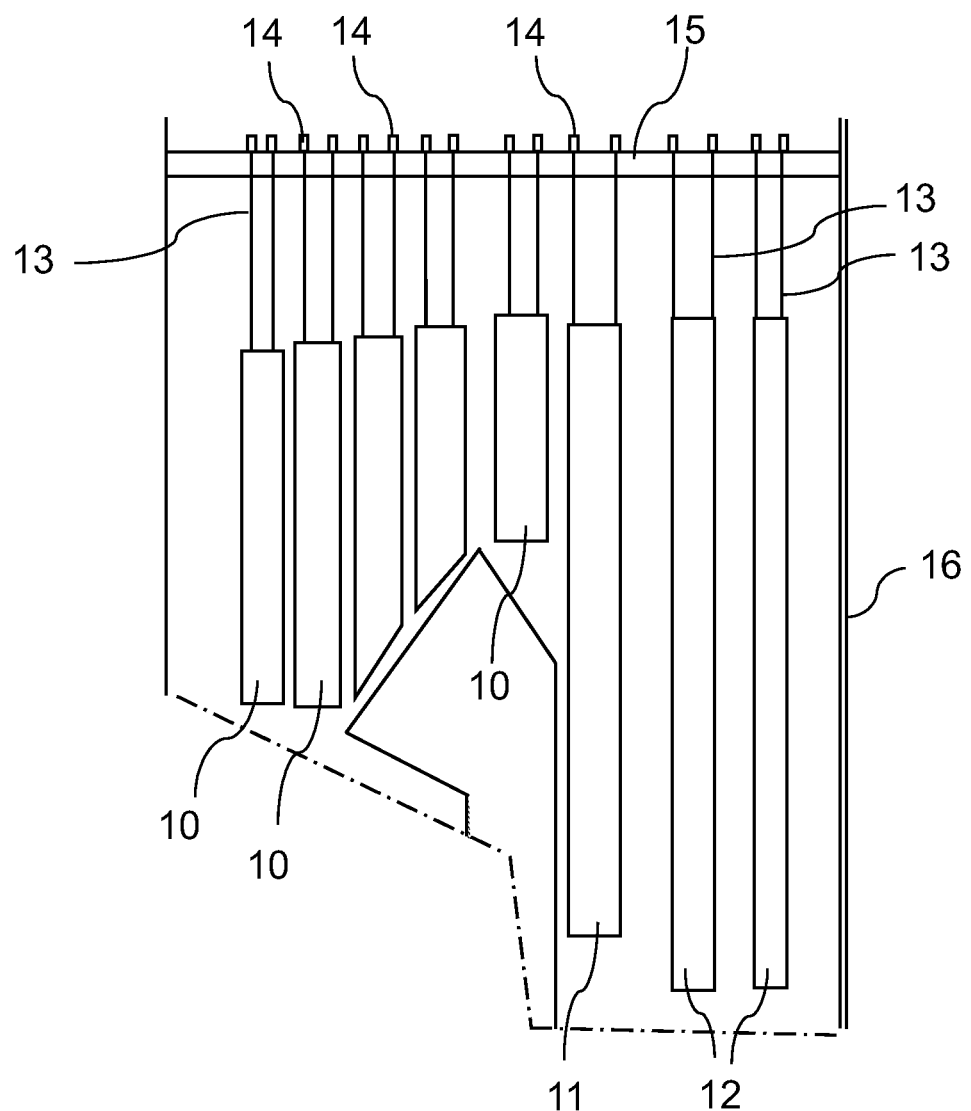
FIG. 1 illustrates as a side view the heat exchanger banks of a recovery boiler and their support on the frame beams of the boiler.

Suspending the structural parts of a steam boiler from the frame columns 16 and frame beams 15 facilitates their unobstructed thermal expansion. FIG. 1 illustrates the support of the heat exchangers 10, 11, 12 of a recovery boiler to the frame structures 15, 16 of the boiler. The number of heat exchanger banks 10, 11, 12 varies according to the type of boiler. In this case the recovery boiler comprises eight heat exchanger banks 10, 11, 12, of which in the flow direction of flue gas the five first ones are superheaters 10, which are followed by boiler tubes 11 and the last two heat exchanger banks are water preheaters 12. Each heat exchanger bank 10, 11, 12 comprises a number of plate elements consisting of heat transfer tubes, inside which elements the heat transfer medium (water or steam) flows. The heat releasing hot flue gas flows between the heat exchanger plates, which form the heat exchanger bank 10, 11, 12. Each heat transfer plate is suspended by means of two hanger rods 13 from two support beams 14, which in turn are supported to the frame beams 15.

Figure 2:
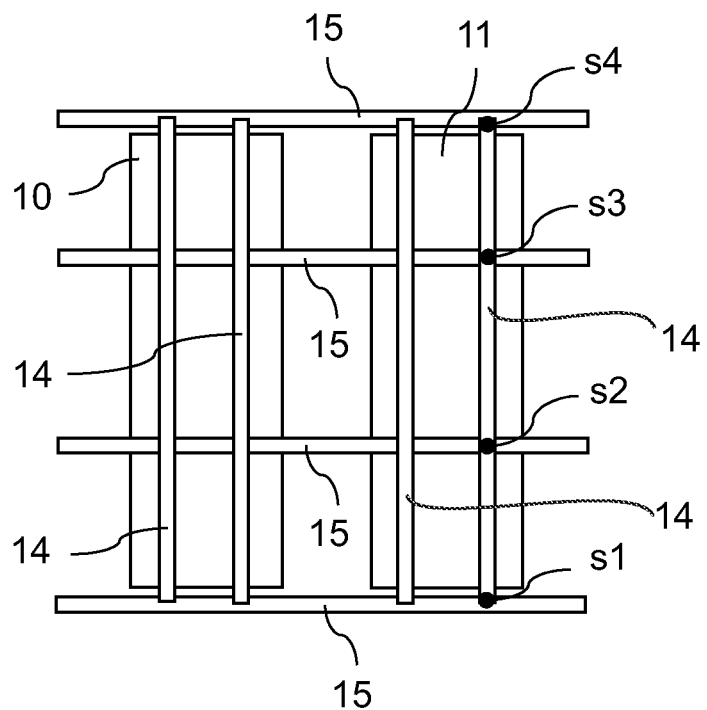
FIG. 2 illustrates the support structures of two heat exchanger banks as seen from above.
Figure 3:
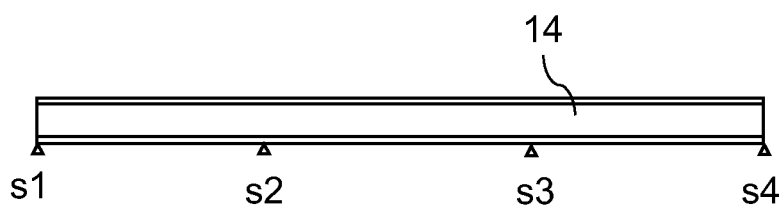
FIG. 3 shows the support points of a support beam.
Figure 4:
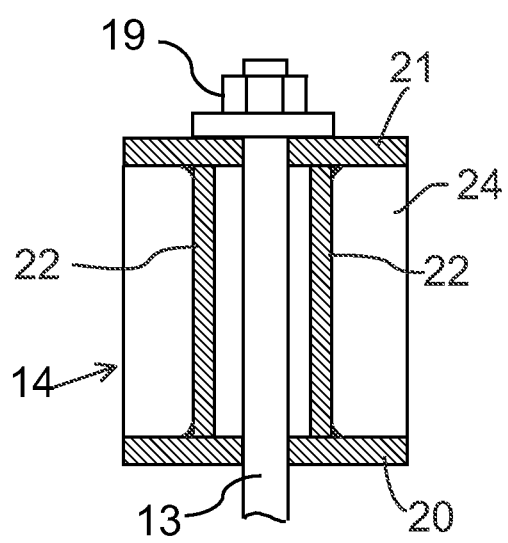
FIG. 4 shows an example of the fixing of a hanger rod to a support beam.

FIG. 2 illustrates two heat exchanger banks 10, 11 as seen from above the boiler, each of which banks is suspended by means of hanger rods (not shown) from two support beams 14, which are supported by four frame beams 15. Each support beam 14 is supported by each frame beam 15 at four support points s1, s2, s3, s4. FIG. 3 shows the support beam 14 and its support points s1, s2, s3, s4 as a side view. FIG. 4 shows a way of fixing the hanger rod 13 to the support beam 14. As illustrated, the hanger rod 13 is arranged to pass through the support beam 14 and the upper end of the hanger rod 13 is secured to the upper surface of the support beam 14 by means of a nut 19.

The support beam 14 illustrated in FIG. 4 comprises a lower flange 20, an upper flange 21 and two web plates 22 connecting the lower flange 20 to the upper flange 21. The upper flange 21 bears the weight of a heat exchanger bank 10, 11, 12 transmitted to the upper flange 21 by hanger rods 13. The lower flange 20 receives support forces $R_{FEM}$ exerted by frame beams 15 on the support beam 14 at support points s1, s2, s3 and s4. The web plates 22 do not substantially bear a load but are subject to the shear forces arising due to the support forces $R_{FEM}$ and the load transmitted by the hanger rods.

The support beam 14 may be for example a single-web I-beam or a double-web box beam or rectangular beam. In all cases, the support beam 14 comprises an upper horizontal support element, a lower horizontal support element and at least one vertical support element that connects them. From the vertical support element, the stretching caused by the strains that are generated in the support beam 14 by the support reaction $R_{FEM}$ can be measured.

Heat exchanger banks 10, 11, 12 suspended from hanger rods 13 exert a downwards drawing force on a support beam 14, which is compensated for by a support force, i.e. support reaction $R_{FEM}$, applied from a frame beam 15 to the support beam 14 at support points s1, s2, s3, s4. These load forces and support forces cause local strain states in the support beam 14, which can be measured by means of strain gages. Therefore, in the method according to the invention, the mass changes of the heat exchanger bank 10, 11, 12 are measured by means of strain gages that are glued to the support beams 14 supporting the heat exchanger bank. Preferably these strain gages are located near to the support points s1, s2, s3, s4 of the support beams 14.

Figure 5:
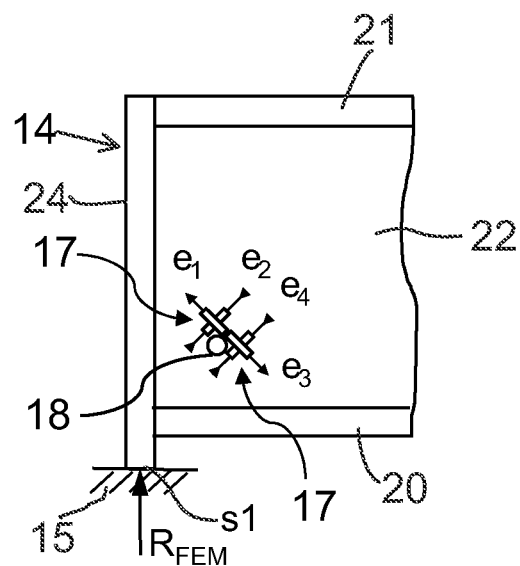
FIG. 5 illustrates a measurement point at the end of a support beam.

FIG. 5 shows the preferred position of strain gages 17 on the web plate 22 of a support beam 14 near to a support point s1 or s4 at the end of the beam, at which support point a support force $R_{FEM}$ is applied to the support beam 14.

Figure 6:
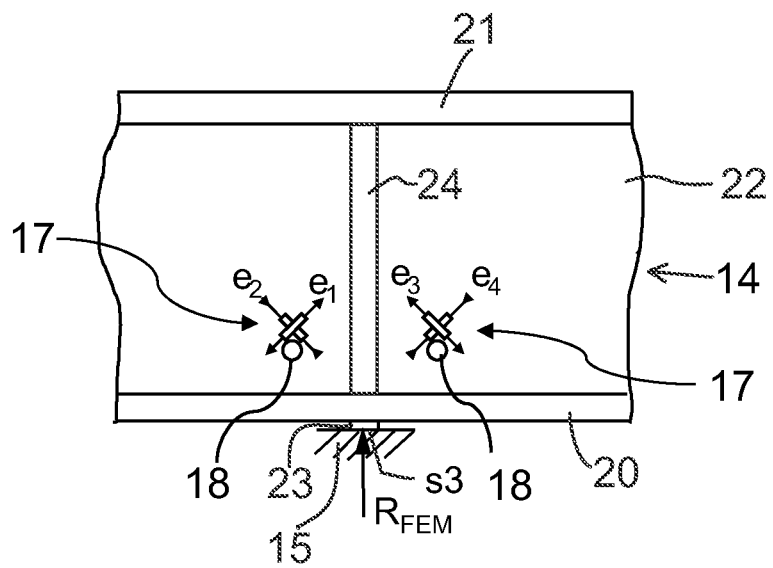
FIG. 6 illustrates a measurement point in the middle of a support beam.

FIG. 6 shows correspondingly the preferred position of strain gages 17 on the web plate 22 of a support beam 14 near to support points s2 (shown in the figure) and s3 (corresponds to s2) in the middle of the beam, at which support points a support force $R_{FEM}$ is applied to the support beam 14.

FIG. 6 also shows that a spacer element 23 may be located at a support point s3 (and s2, respectively) between a support beam 14 and a frame beam 15 in order to limit the area subject to the support reaction, which facilitates the arrangement of the measurement point near to the lower edge of the web 22 in the position most preferred in terms of detecting the change in stretching caused by the principal strain. A vertical stiffener 24 may preferably be fixed to the web 22 of the support beam 14 at the support point s2, s3. A vertical stiffener 24 at the support point prevents buckling of the web 22 of the support beam.

Preferably the strain gages used are two pairs of strain gages 17, the strain gages being disposed at an angle of 90° to one another and one strain gage in the pairs of strain gages 17 being positioned in the direction of the principal strain. Thus, in measuring a support point s, a total of four strain gages are used in order to simultaneously conduct measurements in two directions. Preferably the pairs of strain gages 17 are located on the web 22 of a support beam 14 at a point to which the principal strain caused by the support force $R_{FEM}$ of a frame beam 15 is applied approximately at an angle of 45°. Two pairs of strain gages 17 are provided in connection with each support point s to be measured, which gages are connected to each other so that they form a Wheatstone bridge. The pairs of strain gages 17 are preferably glued near to a hole or a notch 18 made near to the support point s1, s2, s3, s4 of the support beam 14. The hole or notch 18 amplifies the strain states of the support beam 14 and improves the sensitivity of the measurement. Measurements of the strain changes in the direction of the principal strains may also be measured by other known measurement methods, observing their known limitations and characteristics.

When strain gages 17 are only arranged on one web plate 22 of a support beam 14, the possible twisting of the support beam in the direction of the longitudinal axis can cause inaccuracy in the measurement results. If so required, this can be eliminated by arranging the measurement points symmetrically on both web plates 22 of the support beam 14, whereby the measurement results from each support point s1, s2, s3, s4 are obtained by summing the measurement results from the measurement points of both web plates 22. In this case, the amount of the measurement channels needed is doubled.

An error caused by temperature changes is automatically compensated for, when strain gages are connected in a Wheatstone full bridge connection and all sensors are at the same temperature. The measurement bridge is connected so that as the resistances of the sensors change in the same direction (temperature changes), the bridge remains is equilibrium, but as the resistances change in different directions, the bridge easily falls out of equilibrium. When a constant voltage source is fed into the bridge, the loss of equilibrium is seen as the output voltage of the bridge. Thus, the output voltage is directly proportional to the strain state of a support beam. The signal obtained from the bridge connection is amplified and entered via a data logging system into a calculation unit for saving and analyzing the data.

The measurement system comprises at least a data logging system and a computer or another calculation unit having a computer program for processing the data recorded by means of strain gages. The computer program receives the measurement data coming from the data logging system, processes it by converting the measurement signal to data representing the mass or mass change of the heat exchanger, compiles statistical data and converts the data to other formats.

The calibration of the measurement system can be performed as direct calibration by loading a support beam 14 with known masses or by means of the finite-element method. In direct calibration, the calibration coefficients are calculated using signals measured by means of known masses. In dynamic calibration, masses are moved along the support beam 14, while in static calibration, known static masses are suspended from several points of the support beam 14. In calibration based on the finite-element method, theoretical calibration coefficients are calculated by means of the setting values of the data logging system, characteristics of strain gages and theoretical stretch values in the optimal positions of the strain gages 17 obtained by finite-element modeling.

The digital signals measured by means of strain gages 17 can be converted to values representing the mass or mass change of a heat exchanger bank 10, 11, 12 by means of the following equation:

$$W_{i,s} = CF_{\varepsilon\text{-}W,s} \cdot CF_{S\text{-}\varepsilon} \cdot (S_{i,s} - S_{0,s}) \quad (1)$$

where $W_{i,s}$ is the mass measured at a support point s at a moment of time $t_i$;

$CF_{\varepsilon\text{-}W,s}$ is the conversion factor between stretch and a mass applied to the support point s (equation 2). The theoretical value of the factor $CF_{\varepsilon\text{-}W,s}$ can be calculated by the finite-element method from the strains of the beam;

$CF_{S\text{-}\varepsilon}$ is the conversion factor between the digital output signal of the data logging system and the stretch measured from the strain gages (equation 3). $CF_{S\text{-}\varepsilon}$ depends on the settings of the data logging system and the configuration of the strain gages (in this case a Wheatstone full bridge having four active gages at each support point s);

$S_{i,s}$ is the output signal produced by the data logging system from the strain gages at the support point s at a certain moment of time $t_i$;

$S_{0,s}$ is the output signal produced by the data logging system from the strain gages at the support point s, which corresponds to a 0-mass (i.e. the output signal at the beginning of the measurements while the boiler is clean).

The conversion factor $CF_{\varepsilon\text{-}W,s}$ can be calculated by means of the following equation:

$$CF_{\varepsilon-W,s} = \frac{R_{FEM}}{\varepsilon_{1,5} - \varepsilon_{2,5} + \varepsilon_{3,5} - \varepsilon_{4,5}} \quad (2)$$

where $R_{FEM}$ is the support reaction at a support point s calculated by the finite-element method (in order to obtain the mass $W_i$ in kilograms, $R_{FEM}$ has to be converted to kilograms);

$\varepsilon_{1,s} \ldots \varepsilon_{4,s}$ is the relative stretch of strain gages in a specific direction calculated by the finite-element method (FIGS. 4 and 5).

The conversion factor $CF_{S\text{-}\varepsilon}$ can be calculated by means of the following equation:

$$CF_{S-\varepsilon} = \frac{4 \cdot U_{out}}{GF \cdot U_{exc}} \quad (3)$$

where $U_{out}$ is the output voltage, i.e. measured voltage, of the data logging system (equation 4);

GF is the gage constant given by the strain gage producer;

$U_{exc}$ is the excitation voltage of the Wheatstone bridge.

The output voltage $U_{out}$ can be calculated by means of the following equation:

$$U_{out} = \frac{\Delta U}{\text{gain} \cdot 2^m} \quad (4)$$

where $\Delta U$ is the overall measurement zone of the data logging system;

gain is the amplification coefficient of the data logging system;

m is the resolution of the data logging system.

By means of adding up the support reactions $R_{FEM}$ providing the equilibrium of the loads applied to one support beam 14 at a certain moment of time and comparing them to a situation where the heat exchanger bank 10, 11, 12 has just been cleaned, the change of the overall support reaction after cleaning of the heat exchanger bank and thus the mass increase of the heat exchanger bank are obtained.

When comparing the strain state changes of support beams 14 supporting the front edge and the rear edge (as seen in the flow direction) of a heat exchanger bank 10, 11, 12 at individual measurement points, a view can be obtained on how the mass increases are accumulated in the horizontal plane, i.e. on the left or right side or on the side of the front edge or the rear edge. Since soot-blowing devices are also on different heights, the mass change exited during an individual soot-blowing operation allows one to estimate the mass accumulation of the heat exchanger bank 10, 11, 12 and the efficiency of the soot-blowing also in the vertical direction. Since the mass accumulation is often uneven and two- or even three-dimensional data on the accumulation and exit of mass is obtained, the soot-blowing devices can be controlled in the most optimal way by means of the measurement data obtained to remove the deposits at a proper time within the operational area of even a single soot-blowing device.

The invention claimed is:

1. A method for monitoring mass changes of a heat exchanger bank of a steam boiler having an upper section including frame beams supporting support beams, wherein the support beams rest on the frame beams at support points, wherein the heat exchanger bank is supported by vertical hanger rods, and the vertical hanger rods are supported by the support beams, the method comprising:
   monitoring strain in vertical support elements of the support beams by strain gages mounted to the vertical support elements, wherein the strain gages are each located a horizontal distance from a nearest one of the support points no greater than a vertical width of the vertical support element, and
   using signals from the strain gages which indicate the strain in the vertical support elements to calculate a change in the mass of the heat exchanger bank.

2. The method according to claim 1, wherein the monitoring of strain includes monitoring changes of a strain state at each of the support points by four strain gages of the strain gages proximate each of the support points, wherein the four of the strain gauges form a Wheatstone full bridge connection.

3. The method according to claim 2, wherein two of the four strain gauges are provided in a direction of a principal strain and another two of the four strain gauges are provided perpendicularly to said direction of the principal strain.

4. The method according to claim 3, wherein the principal strain is determined by a finite-element method.

5. The method according to claim 1, wherein at least one of the support beams includes a parallel pair of the vertical support elements, wherein each of the parallel pair of the vertical support elements has mounted thereto a respective one of the strain gages.

6. The method according to claim 1, wherein the strain gauges are each located on a respective one the a vertical support elements at a point to which a principal strain provided by a support force (RFEM) of one of the frame beams is applied at an angle of 45 degrees.

7. The method according to claim 1, further comprising calibrating a mass measurement system by placing a known mass in a known position on one of the support beams.

8. The method according to claim 7, further comprising calibrating the mass measurement system by a finite-element method.

9. A system for monitoring mass changes of a heat exchanger bank of a steam boiler, wherein the steam boiler includes an upper network of horizontally oriented frame beams and support beams extending over and supported by the frame beams at support points where the support beams attach to the frame beams, wherein the heat exchanger bank is suspended below the network by vertical hanger rods connected to and hanging down from the support beams;

strain gauges fixed to vertical support elements of the support beams and each of the strain gauges located a horizontal distance from a nearest one of the support points no greater than the vertical width of the vertical support element to which the strain gauge is fixed, wherein the strain gages are configured to measure changes of a strain state in one or more of the support beams due to the mass of the heat exchanger bank;

a data logger configured to log the measurements of the strain gauges, and a computer configured to process the measurement data.

10. A method to detect a mass change of a heat exchanger bank suspended in a steam boiler, wherein the steam boiler includes an upper network of frame beams and support beams extending across the frame beams and resting on the frame beams at support points, wherein the support beams each include an upper flange, a lower flange and a vertical web plate joining the upper flange to the lower flange, and the lower flange rests on the frame beams;

wherein the heat exchanger bank is suspended below the upper network of frame beams and support beams by vertical hanger rods, and the vertical hanger rods are attached to the upper flange of the support beams, the method comprising:

monitoring strain in the vertical web plate of at least one of the support beams by strain gages mounted to the vertical web plates at locations proximate the support points, wherein each of the locations on the vertical web plates are a horizontal distance from a nearest one of the support points no greater than the vertical width of the web plate, and detecting a change in a mass of the heat exchanger bank using signals generated by the strain gages, wherein the signals indicate a strain on the vertical web plates to which is attached the strain gage generating the signal.

11. The method of claim 10 wherein the detection of the change in the mass includes comparing the signals from the strain gages on a first one of the vertical support beams to the signals from the strain gages on a second one of the vertical support beams, wherein the first one is upstream of the second one in a flow direction through the steam boiler.

12. The method of claim 11 further comprising controlling a soot blowing operation to remove deposits on the heat exchanger bank.

13. The method of claim 10 further comprising using the detected change in the mass to initiate at least one of a soot blowing operation, a temporary cooling cycle of the steam boiler and a shut-down of the steam boiler.

14. The method of claim 1 wherein each of the strain gages is adjacent a corresponding hole in the support element on which the strain gauge is attached.

15. The system of claim 9 wherein each of the strain gages is adjacent a corresponding hole in the support element on which the strain gauge is attached.

16. The method of claim 10 wherein each of the strain gages is adjacent a corresponding hole in the vertical web plate on which the strain gauge is attached.

* * * * *